United States Patent
Li et al.

(10) Patent No.: US 7,636,462 B2
(45) Date of Patent: Dec. 22, 2009

(54) METHOD AND SYSTEM FOR FILTERING IN MEDICAL IMAGING

(75) Inventors: Jianying Li, New Berlin, WI (US); Jiang Hsieh, Brookfield, WI (US); Xiangyang Tang, Waukesha, WI (US); Darin Robert Okerlund, Muskego, WI (US); Melissa L. Vass, Milwaukee, WI (US); Kelly Ann Mohr, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 922 days.

(21) Appl. No.: 10/944,097

(22) Filed: Sep. 17, 2004

(65) Prior Publication Data

US 2006/0062485 A1    Mar. 23, 2006

(51) Int. Cl.
*G06K 9/00*  (2006.01)
(52) U.S. Cl. .............................. 382/128; 128/922; 378/4
(58) Field of Classification Search ................ 382/100, 382/128, 129, 130, 131, 132, 133; 128/922; 378/4–27
See application file for complete search history.

(56) References Cited

U.S. PATENT DOCUMENTS

| | | | | | |
|---|---|---|---|---|---|
| 5,544,212 | A | * | 8/1996 | Heuscher | 378/15 |
| 5,732,117 | A | * | 3/1998 | Sato et al. | 378/15 |
| 5,864,597 | A | * | 1/1999 | Kobayashi | 378/4 |
| 5,974,108 | A | * | 10/1999 | Taguchi et al. | 378/4 |
| 6,339,632 | B1 | * | 1/2002 | Besson | 378/15 |
| 6,587,537 | B1 | * | 7/2003 | Hsieh | 378/4 |
| 6,665,370 | B2 | * | 12/2003 | Bruder et al. | 378/15 |
| 2004/0017881 | A1 | * | 1/2004 | Cesmeli et al. | 378/4 |
| 2004/0114727 | A1 | * | 6/2004 | Yan et al. | 378/210 |

* cited by examiner

*Primary Examiner*—Anand Bhatnagar
(74) *Attorney, Agent, or Firm*—Armstrong Teasdale LLP

(57) ABSTRACT

A method and system for filtering medical images is described. The described method of filtering medical images includes receiving image data including a plurality of images from an image scan, determining a number of interpolation elements based on a slice thickness of the plurality of images, and filtering the image data using the determined interpolation elements.

15 Claims, 5 Drawing Sheets

Filtered reformatted image with controlled banding artifacts

Reformatted image with banding artifacts

METHOD AND SYSTEM FOR FILTERING IN MEDICAL IMAGING

BACKGROUND OF THE INVENTION

This invention relates generally to medical imaging systems, and more particularly, to image filtering in medical imaging systems.

Medical imaging systems are used for acquiring medical images of various body parts such as the heart, lungs and the like. For example, medical imaging of the heart may involve acquiring images of the heart in various heart cycles. These images typically include image slabs. The image slabs generally are defined by a group of images acquired at a point of time in the heart cycle. These images are then combined to generate an image of the whole heart. Because the acquired images are discontinuous in time, the combined images have gray scale non-uniformities, also referred to as banding. This banding also may be caused by gaps or mismatches between image slabs when the image slabs are joined together to form an image. Banding is even more prominent when imaging using contrast because contrast distribution is not uniform among various image slabs.

Known methods to reduce banding in medical images include identifying image bands and removing images on the boundary of image slabs that cause image bands. These known methods result in loss of information, which is undesirable.

BRIEF DESCRIPTION OF THE INVENTION

In one exemplary embodiment, a method for filtering in medical imaging is provided. The method includes receiving image data including a plurality of images from an image scan, determining a number of interpolation elements based on a slice thickness of the plurality of images, and filtering the image data using the determined interpolation elements.

In another exemplary embodiment, a medical imaging system is provided. The medical imaging system includes a medical imaging scanner and a processor, wherein the medical imaging scanner is configured to acquire image data, and the processor is configured to receive the acquired image data including a plurality of images. The processor is further configured to determine a number of interpolation elements based on a slice thickness of the plurality of images. Additionally, the processor is configured to filter the image data using the determined interpolation elements.

DETAILED DESCRIPTION OF THE INVENTION

Various embodiments of the invention provide methods and systems for filtering in medical imaging systems. In the various embodiments, the medical imaging system may be any type of imaging system, including, for example, a computed tomography system or a magnetic resonance imaging system. The various embodiments provide filtering to control banding artifacts in reformatted medical images.

Figure 1:
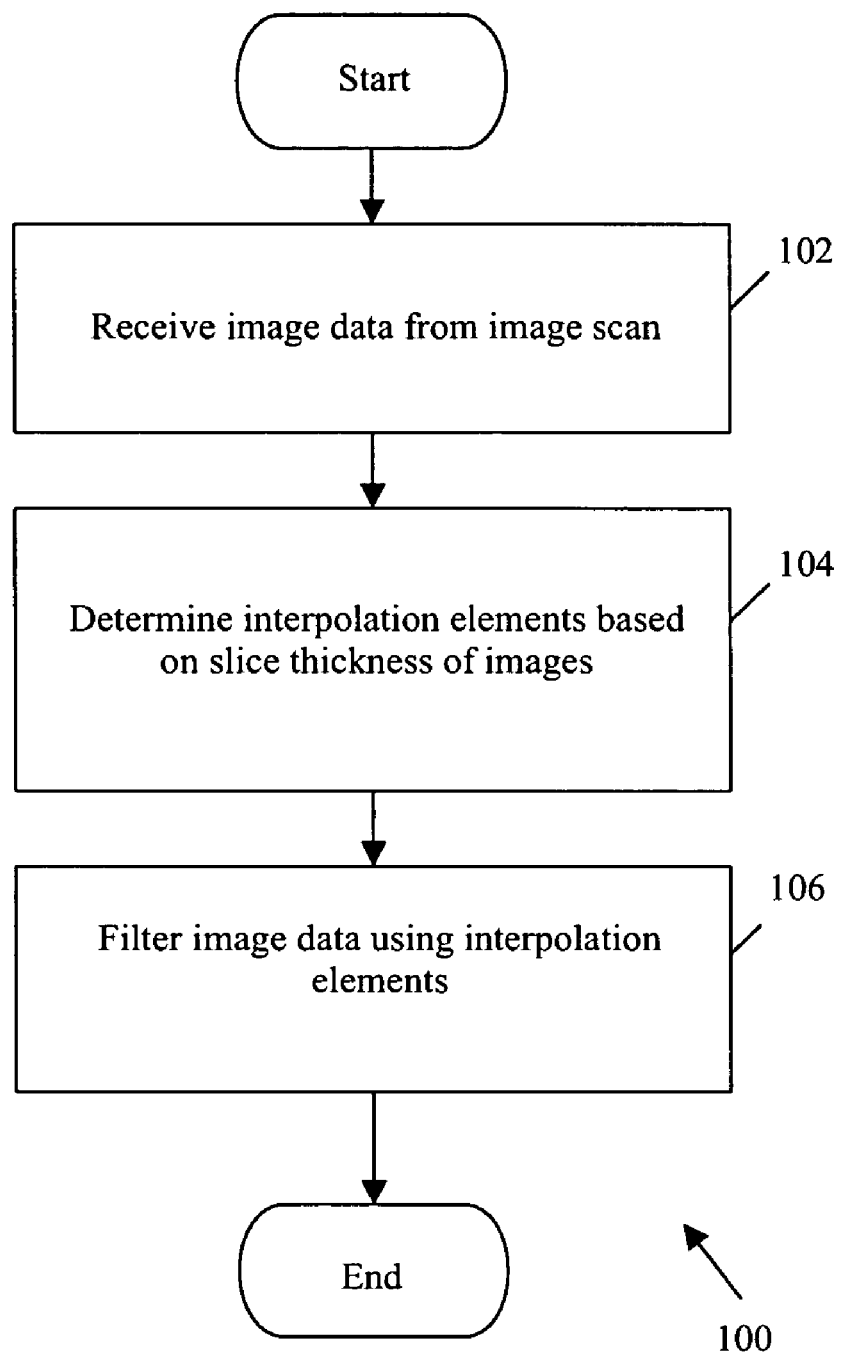
FIG. 1 is a flowchart of a method for filtering in a medical imaging system in accordance with an exemplary embodiment of the invention.

FIG. 1 is a flowchart of a method 100 for filtering in a medical imaging system in accordance with an exemplary embodiment of the invention. Specifically, at 102, image data including a plurality of images is received from an image scan (e.g., image data from a computed tomography system). The image data includes image slabs, wherein in one embodiment, the image slabs are defined or are comprised of a group of images acquired at a point of time (e.g., in the heart cycle). The image slabs include at least one or more images. At 104, a number of interpolation elements are determined based on a slice thickness of the plurality of images. The slice thickness information can be obtained from an image header or from scan setups as is known. At 106, the image data is filtered by using the interpolation elements determined at 104 and as described in more detail herein. In general, in various embodiments, the filtering further includes determining adjacent images in the different image slabs. Subsequently, intermediate images for the adjacent images are determined by using interpolation. Based on the plurality of the adjacent images and the intermediate images, difference images are generated. The difference images are then truncated by using pre-defined threshold values. The truncated difference images are then filtered. Finally, an output image is generated by combining the filtered truncated difference images with the plurality of acquired images by using weighting factors. This method of filtering provides reduction of banding artifacts present in the acquired images.

Figure 2:
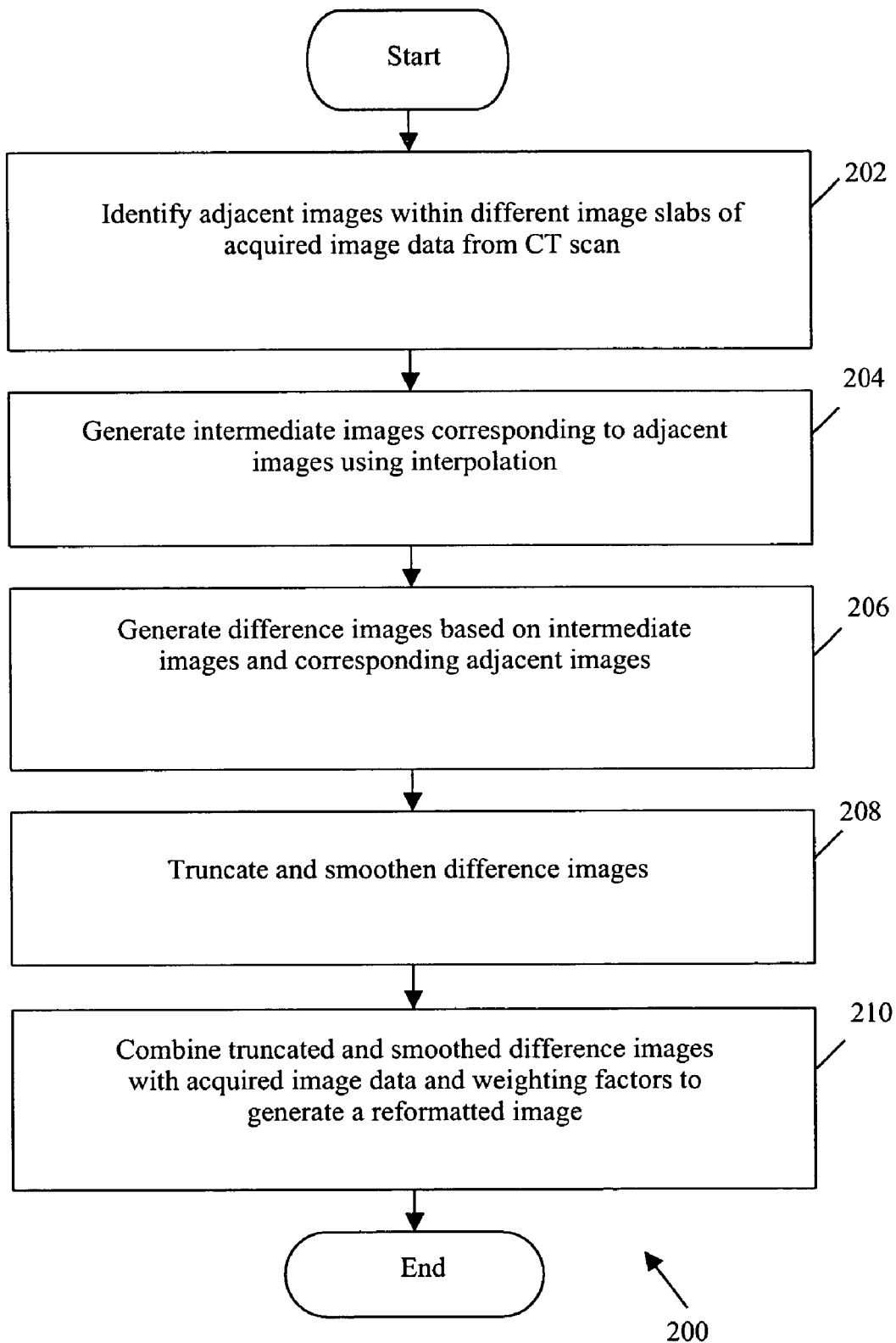
FIG. 2 is a flowchart of a method for controlling banding artifacts in computed tomography reformatted images in accordance with an exemplary embodiment of the invention.

FIG. 2 is a flowchart of a method 200 for filtering, and more particularly, a method for controlling banding artifacts in computed tomography reformatted images in accordance with an exemplary embodiment of the invention. Computed tomography reformatted images are typically acquired after generation from a computed tomography scan of a scan subject.

Specifically, at 202, adjacent images are identified within different image slabs of the acquired image data corresponding to the computed tomography images. At 204, intermediate images are generated corresponding to the adjacent images by using interpolation. At 206, difference images are generated based on the intermediate images and the corresponding adjacent images as described below. At 208, the difference images are truncated and smoothed. At 210, the truncated and smoothed difference images are combined with the acquired image data by using weighting factors and a reformatted image is generated. Each of these steps will now be described in more detail.

More particularly, the adjacent images are identified within the different image slabs of the acquired image data corresponding to the computed tomography images at 202. Images of a portion of, for example, a scan subject are scanned at a time 't'. The scanning of images takes a comparatively lesser amount of time as compared to 't'. These images of a portion of the scan subject scanned at time 't' define an image slab. Such image slab is identified by a midscan time parameter. The midscan time parameter is the same for all images in the image slab. The midscan time parameter is a measurement of the time from the beginning of the computed tomography scan to the mid point of the time period when the images in the image slab are scanned.

In an exemplary embodiment of the invention, the computed tomography scan may be, for example, of a heart. In this case, computed tomography scanning of the heart is performed for various heart cycles. Image slabs at the boundary of consecutive heart cycles are identified, with at least one image slab in each heart cycle. Two adjacent images are then identified at the boundary of the consecutive heart cycles, for example, a left image and a right image. The two adjacent images are from the image slabs identified above. Further, at least one image is identified in the heart cycle of the left image, and at least one image is identified in the heart cycle of the right image. The number of images determined in the heart cycles of the left image and the right image is based on, for example, the required or desired resolution of the output images and the required or desired reduction in the banding artifacts.

Figure 3:
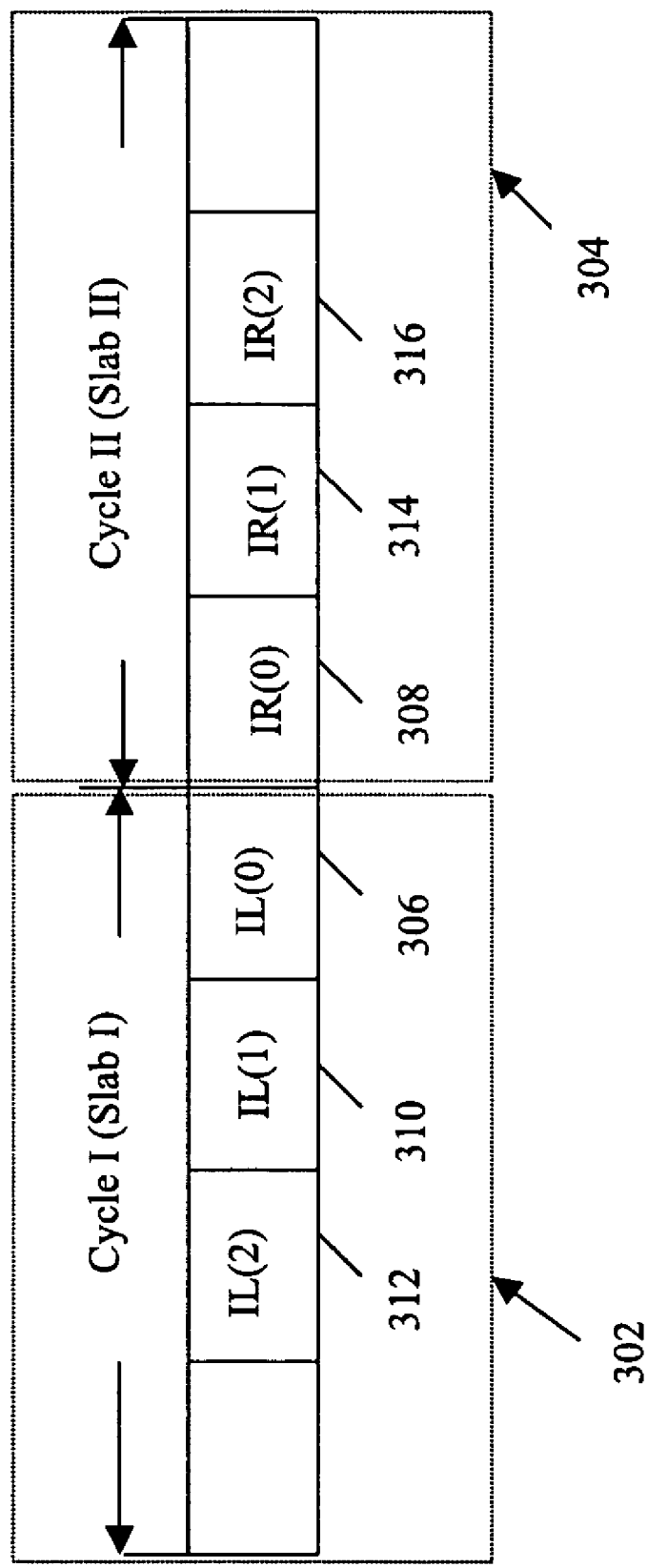
FIG. 3 is a block diagram showing adjacent image slabs in accordance with an exemplary embodiment of the invention.

FIG. 3 is a block diagram showing adjacent image slabs in accordance with an exemplary embodiment of the invention. An image slab I 302 and an image slab II 304 are from, for example, consecutive heart cycles. An image IL(0) 306 and an image IR(0) 308 are adjacent images at the boundary of image slab I 302 and image slab II 304. An image IL(1) 310 and an image IL(2) 312 are images in the heart cycle of image IL(0) 306, while an image IR(1) 314 and an image IR(2) 316 are images in the heart cycle of image IR(0) 308.

After the identification of the adjacent images, the intermediate images are generated corresponding to the adjacent images by using interpolation at 204. Interpolation is performed based on an interpolation kernel length and interpolation coefficients. The interpolation kernel length is selected based on the thickness of image slice. In an exemplary embodiment of the invention, an interpolation kernel length of four is used for images with a sub-millimeter slice thickness, and two is used for images with greater than a millimeter slice thickness. This can be achieved by setting two of the four coefficients to zero. The interpolation coefficients are empirically chosen, for example, depending on the required smoothness and resolution in the image. In an exemplary embodiment of the invention, two intermediate images IML(0) and IMR(0) are generated for image IL(0) 306 and image IR(0) 308 and two intermediate images IML(1) and IMR(1) are generated for image IL(1) 310 and image IR(1) 314. The interpolation coefficients used are C(1), C(2), C(4), C(5), D(1), D(2), D(4), and D(5). The intermediate images are determined using the following equations:

$$IML(0)=C(1)*IL(2)+C(2)*IL(1)+C(4)*IR(0)+C(5)*IR(1) \quad (1)$$

$$IMR(0)=C(1)*IL(1)+C(2)*IL(0)+C(4)*IR(1)+C(5)*IR(2) \quad (2)$$

$$IML(1)=D(1)*IL(2)+D(2)*IL(0)+D(4)*IR(0)+D(5)*IR(1) \quad (3)$$

$$IMR(1)=D(4)*IL(0)+D(5)*IL(1)+D(2)*IR(0)+D(1)*IR(2) \quad (4)$$

Interpolation kernel length and interpolation coefficients may change based on the characteristics of the heart cycle. Further, interpolation kernel length, interpolation coefficients and the number of adjacent and intermediate images used may be adjusted as required or desired to generate output images with different resolutions.

The different images are then generated based on the intermediate images and the corresponding adjacent images at 206. In an exemplary embodiment of the invention, difference images DIL(0), DIR(0), DIL(1), and DIR(1) are calculated using the following equations:

$$DIL(0)=IML(0)-IL(0) \quad (5)$$

$$DIR(0)=IMR(0)-IR(0) \quad (6)$$

$$DIL(1)=IML(1)-IL(1) \quad (7)$$

$$DIR(1)=IMR(1)-IR(1) \quad (8)$$

The difference images are then truncated and smoothed at 208. In an exemplary embodiment of the invention, difference images DIL(0), DIR(0), DIL(1), and DIR(1) are truncated by using pre-defined threshold values, hth for an upper threshold and lth for a lower threshold. The values of hth and lth are determined, for example, experimentally, and depend on the required or desired resolution of the output images and the required or desired reduction in the banding artifacts. If the pixel value in the difference image is greater than hth or lower than lth, it is set to threshold hth or lth. This avoids deleting high-density small structures in the original images or adding high-density small structures to the original images. In an embodiment, a two-dimensional median filtering with a width of nm is then performed on the difference images. In one exemplary embodiment of the invention, a value of five is used for nm. The following equations are used for truncating and smoothing difference images DIL(0), DIR(0), DIL(1), and DIR(1):

$$DIL(0)<hth, \quad DIL(0)>lth, \quad \& \quad MDIL(0)=\text{median}(DIL(0),nm) \quad (9)$$

$$DIR(0)<hth, \quad DIR(0)>lth, \quad \& \quad MDIR(0)=\text{median}(DIR(0),nm) \quad (10)$$

$$DIL(1)<hth, \quad DIL(1)>lth, \quad \& \quad MDIL(1)=\text{median}(DIL(1),nm) \quad (11)$$

$$DIR(1)<hth, \quad DIR(1)>lth, \quad \& \quad MDIR(1)=\text{median}(DIR(1),nm) \quad (12)$$

where median(*,nm) denotes a two dimensional median filter with width of nm. The median filter smoothens the images. The parameters hth, lth and nm are selected such that oversmoothing of the images is avoided.

The truncated and smoothed difference images are then combined with the acquired image data by using weighting factors to generate a reformatted final image at 210. In an exemplary embodiment of the invention, truncated and smoothed difference images MDIL(0), MDIL(1), MDIR(0), and MDIR(1) are combined with images IL(0), IL(1), IR(0), and IR(1) by using weighting factors mw and mw2, to generate final images FIL(0), FIL(1), FIR(0), and FIR(1). The final images are then combined to form an output image with lesser banding artifacts. The following equations are used for calculating final images:

$$FIL(0)=IL(0)+MDIL(0)*mw \quad (13)$$

$$FIR(0)=IR(0)+MDIR(0)*mw \quad (14)$$

$$FIL(1)=IL(1)+MDIL(1)*mw2 \quad (15)$$

$$FIR(1)=IR(1)+MDIR(1)*mw2 \quad (16)$$

The weighting factors mw and mw2 are selected according to the required or desired resolution and the required or desired reduction in banding artifacts.

Figure 4:
FIG. 4 is a diagram illustrating a reformatted image with banding artifacts and a filtered reformatted image with reduced banding artifacts in accordance with various embodiments of the invention.
Figure 4:
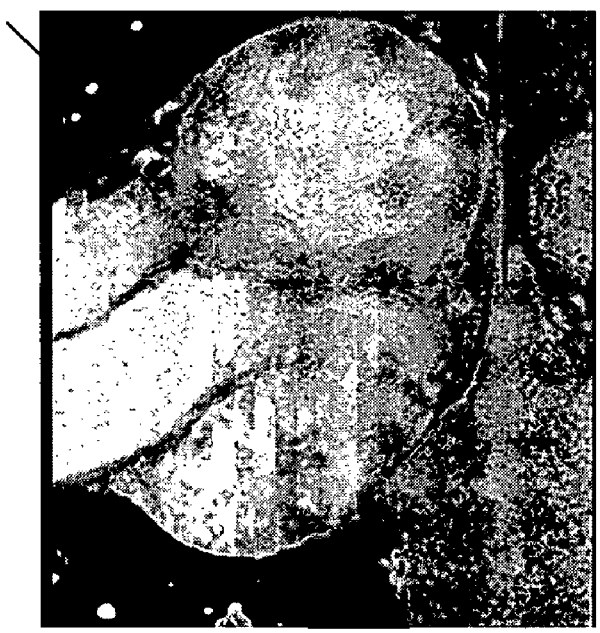

FIG. 4 is a diagram illustrating a reformatted image 402 with banding artifacts and a filtered reformatted image 404 with reduced banding artifacts in accordance with various embodiments of the invention. Reformatted image 402 is an output image generated from a conventional computed tomography scan. Reformatted image 402 has banding artifacts. Filtered reformatted image 404 is obtained after applying the filtering method in accordance with various embodiments of the invention to reformatted image 402. As shown, filtered reformatted image 404 has reduced banding artifacts.

Figure 5:
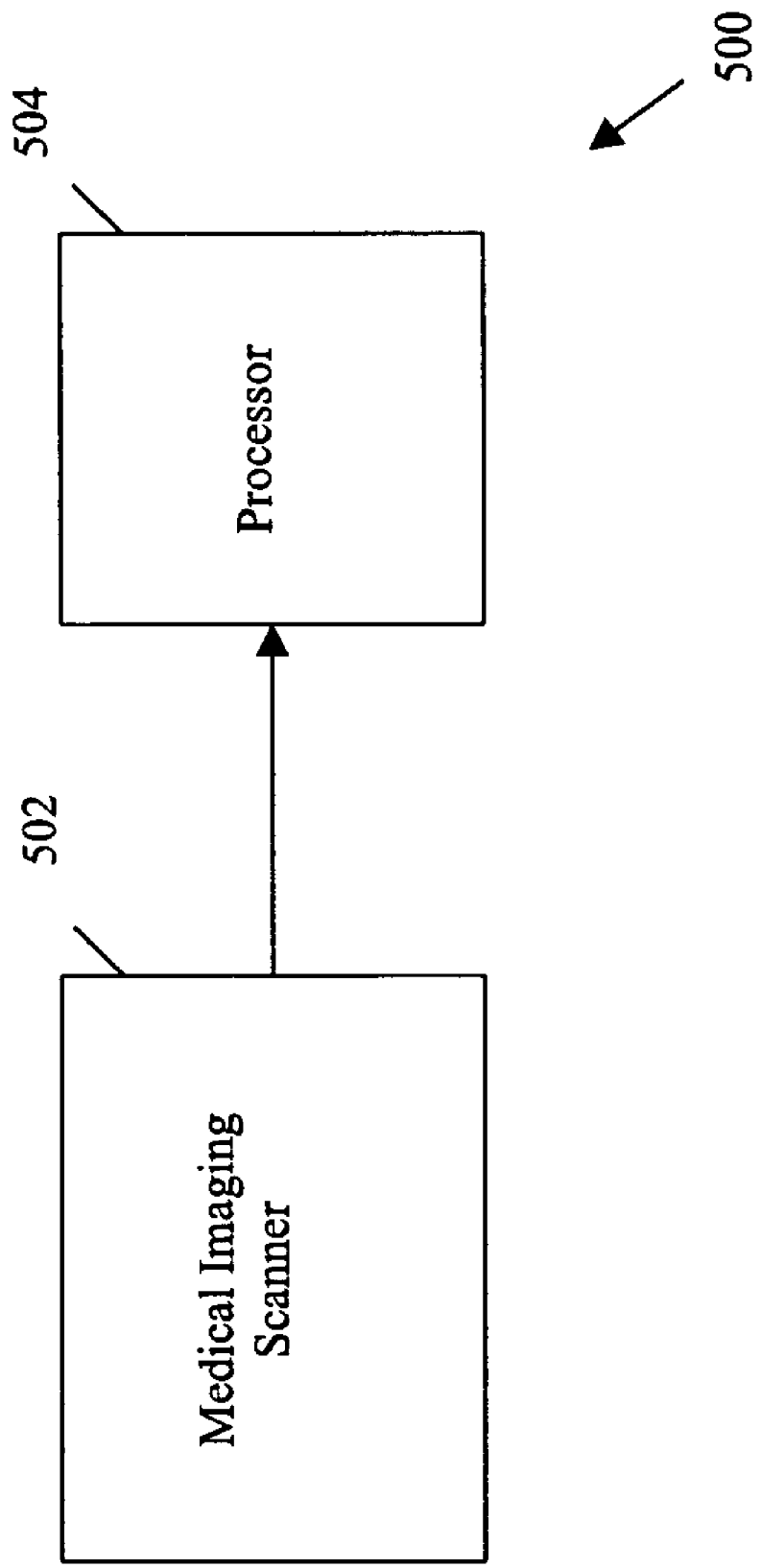
FIG. 5 is a block diagram of a medical imaging system in accordance with an exemplary embodiment of the invention.

FIG. 5 is a block diagram of a medical imaging system 500 in accordance with an exemplary embodiment of the invention and in which the various methods described herein may be implemented. Medical imaging system 500 includes a medical imaging scanner 502 and a processor 504. Medical imaging scanner may be, for example, a computed tomography scanner or a magnetic resonance imaging scanner. Medical imaging scanner 502 acquires image data from a scan of a scan subject (e.g., human patient). Medical imaging scanner 502 may scan the whole scan subject in parts, the scanning performed after predetermined intervals of time depending on, for example, the speed of medical imaging scanner 502. Medical imaging scanner 502 scans images of a portion of the scan subject at time 't'. These images of the portion of the subject scanned at time 't' define or form an image slab. Further, medical imaging scanner 502 communicates the acquired image data to processor 504.

Processor 504 is configured to perform the various embodiments of the methods described herein. Specifically, processor 504 is configured to receive the acquired image data including a plurality of images from medical imaging scanner 502. Processor 504 is further configured to determine a number of interpolation elements based on a slice thickness of the plurality of images. Processor 504 is further configured to filter the acquired image data by using the determined interpolation elements. Processor 504 determines adjacent images in different image slabs to interpolate. Subsequently, processor 504 determines intermediate images for the determined adjacent images. Further, based on the plurality of images and the intermediate images, processor 504 generates difference images. Processor 504 then truncates the difference images by using pre-defined threshold values. The truncated difference images are then filtered. Finally, processor 504 generates an output image by combining the filtered truncated difference images with the plurality of images by using the weighting factors.

Various embodiments of the invention provide a filter that reduces the banding artifacts in reformatted images. The filter also allows the degree of smoothness of the image to be controlled. Further, the filter allows controlling the resolution loss that accompanies the filtering process by an appropriate choice of interpolation kernel length and interpolation coefficients. Moreover, the filtered images may be saved, which enables both the filtered images and original images to be processed and used for various applications.

A technical effect of various embodiments of the invention is to reduce the banding artifacts in the reformatted images. Another technical effect of various embodiments of the invention is to control the resolution loss that accompanies the filtering process by an appropriate choice of interpolation kernel length and interpolation coefficients.

The various embodiments or components, specifically processor 504, may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention may be practiced with modification within the spirit and scope of the claims.

What is claimed is:

1. A method for filtering in medical imaging, said method comprising:
   receiving image data including a plurality of images from an image scan, wherein the image data comprises image slabs, the image slabs each including at least one of the plurality of images;
   determining a number of interpolation elements based on a slice thickness of the plurality of images, wherein the slice thickness is measured between a front side and a back side of the plurality of images; and
   filtering the image data using the determined interpolation elements;
   determining adjacent images in different image slabs to interpolate;

determining intermediate images for the adjacent images;

generating difference images based on the plurality of images and the intermediate images;

truncating the difference images using pre-defined threshold values;

filtering the truncated difference images;

generating an output image by combining the filtered truncated difference images with the plurality of images and one or more weighting factors; and displaying the output image.

2. A method in accordance with claim 1 further comprising determining interpolation coefficients based on the slice thickness of the plurality of images.

3. A method in accordance with claim 1 wherein the interpolation elements define an interpolation kernel length.

4. A method in accordance with claim 1 wherein the number of interpolation elements is based on a number of images to be filtered.

5. A method in accordance with claim 1 further comprising determining different image slabs based on a midscan time parameter.

6. A method in accordance with claim 1 wherein the medical imaging comprises one of computed tomography and magnetic resonance imaging.

7. A method in accordance with claim 1 wherein the at least one of the plurality of images is obtained during a time period corresponding to a heart cycle and wherein the determined adjacent images consecutive heart cycles in the different image slabs to interpolate.

8. A method in accordance with claim 1 wherein the filtering is performed after image data acquisition.

9. A method to control banding artifacts in computed tomography reformatted images, said method comprising:

identifying adjacent images within different image slabs of acquired image data from a computed tomography scan;

generating intermediate images corresponding to the adjacent images using interpolation, a number of adjacent images and an interpolation kernel length used for the interpolation based on an image slice thickness;

generating difference images based on the intermediate images and the corresponding adjacent images;

truncating and smoothing the difference images; and combining the truncated and smoothed difference images with the acquired image data and one or more weighting factors to generate a reformatted image;

displaying the reformatted image.

10. A method in accordance with claim 9 further comprising identifying different image slabs using a midscan time parameter.

11. A method in accordance with claim 9 further comprising determining interpolation coefficients for use in the interpolation based on the image slice thickness.

12. A method in accordance with claim 9 further comprising selecting a number of adjacent images to interpolate based on filtering requirements.

13. A method in accordance with claim 9 wherein the truncating is performed based on pre-defined threshold values.

14. A method in accordance with claim 9 wherein the smoothing comprises median filtering.

15. A medical imaging system comprising:

a medical imaging scanner for acquiring image data, wherein the image data comprises image slabs, the image slabs each including at least one of the plurality of images; and a processor configured to:

receive the acquired image data including a plurality of images, determine a number of interpolation elements based on a slice thickness of the plurality of images, wherein the slice thickness is measured between a front side and a back side of the plurality of images, filter the image data using the determined interpolation elements, determine adjacent images in different image slabs to interpolate, determine intermediate images for the adjacent images, generate difference images based on the plurality of images and the intermediate images, truncate the difference images using pre-defined threshold values, filter the truncated difference images, generate an output image by combining the filtered truncated difference images with the plurality of images and one or more weighting factors, and display the output image on a display device.

* * * * *

UNITED STATES PATENT AND TRADEMARK OFFICE
CERTIFICATE OF CORRECTION

PATENT NO.      : 7,636,462 B2                                       Page 1 of 1
APPLICATION NO. : 10/944097
DATED           : December 22, 2009
INVENTOR(S)     : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this

Ninth Day of November, 2010

David J. Kappos
*Director of the United States Patent and Trademark Office*